Figure 21:
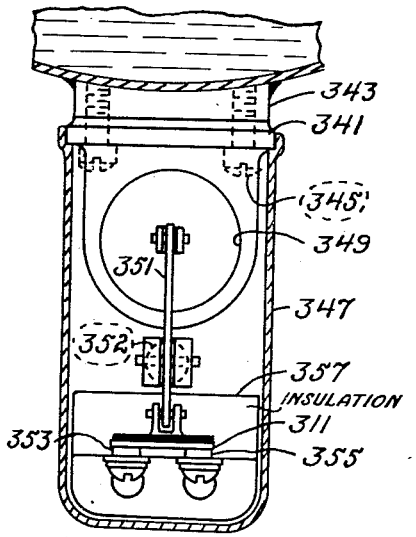

Feb. 18, 1947.  C. M. OSTERHELD  2,415,965
CREEP-TYPE THERMAL RETARDER FOR WATER HEATING CONTROL SYSTEMS
Filed May 29, 1944  8 Sheets-Sheet 1
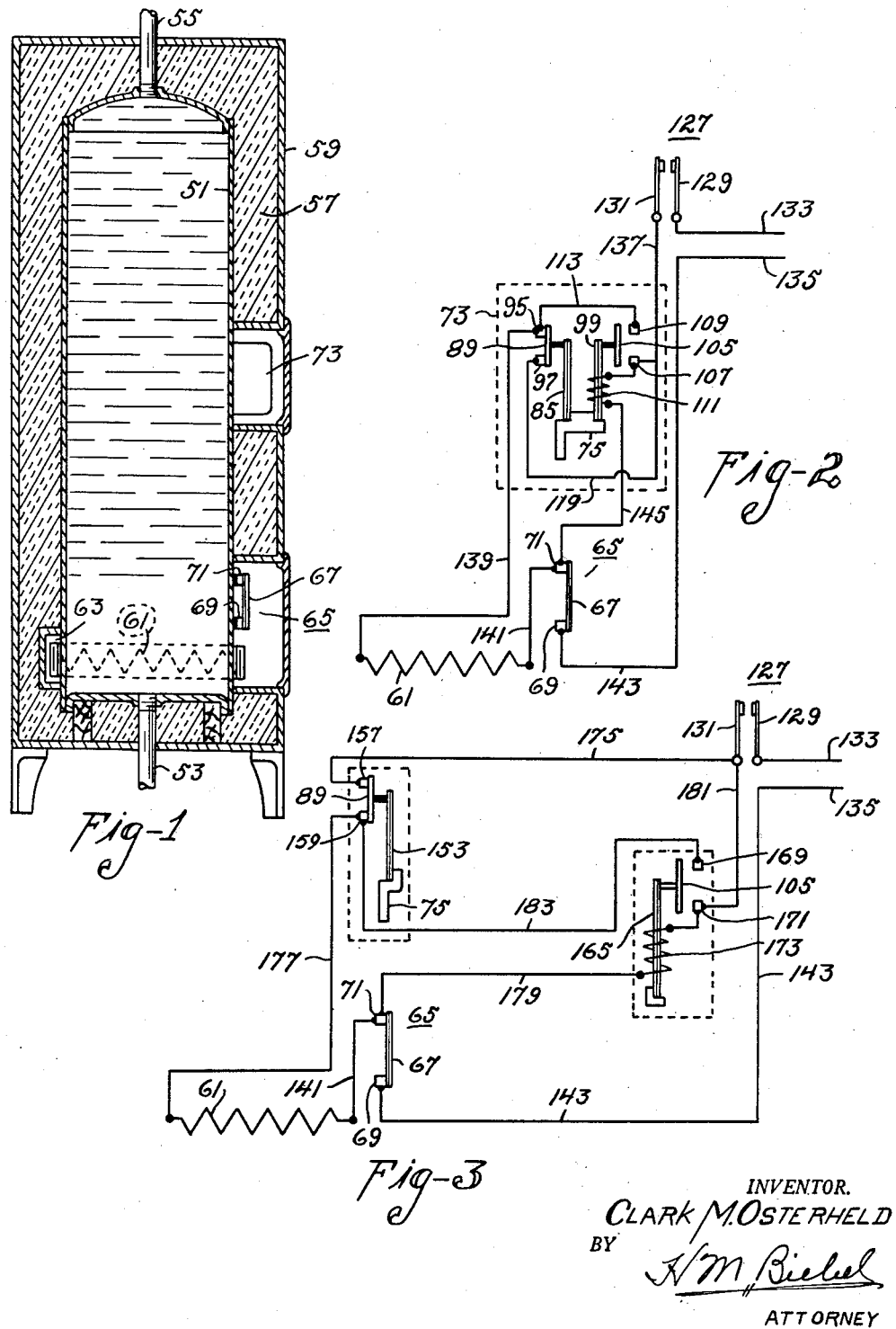
INVENTOR.
CLARK M. OSTERHELD
BY
ATTORNEY

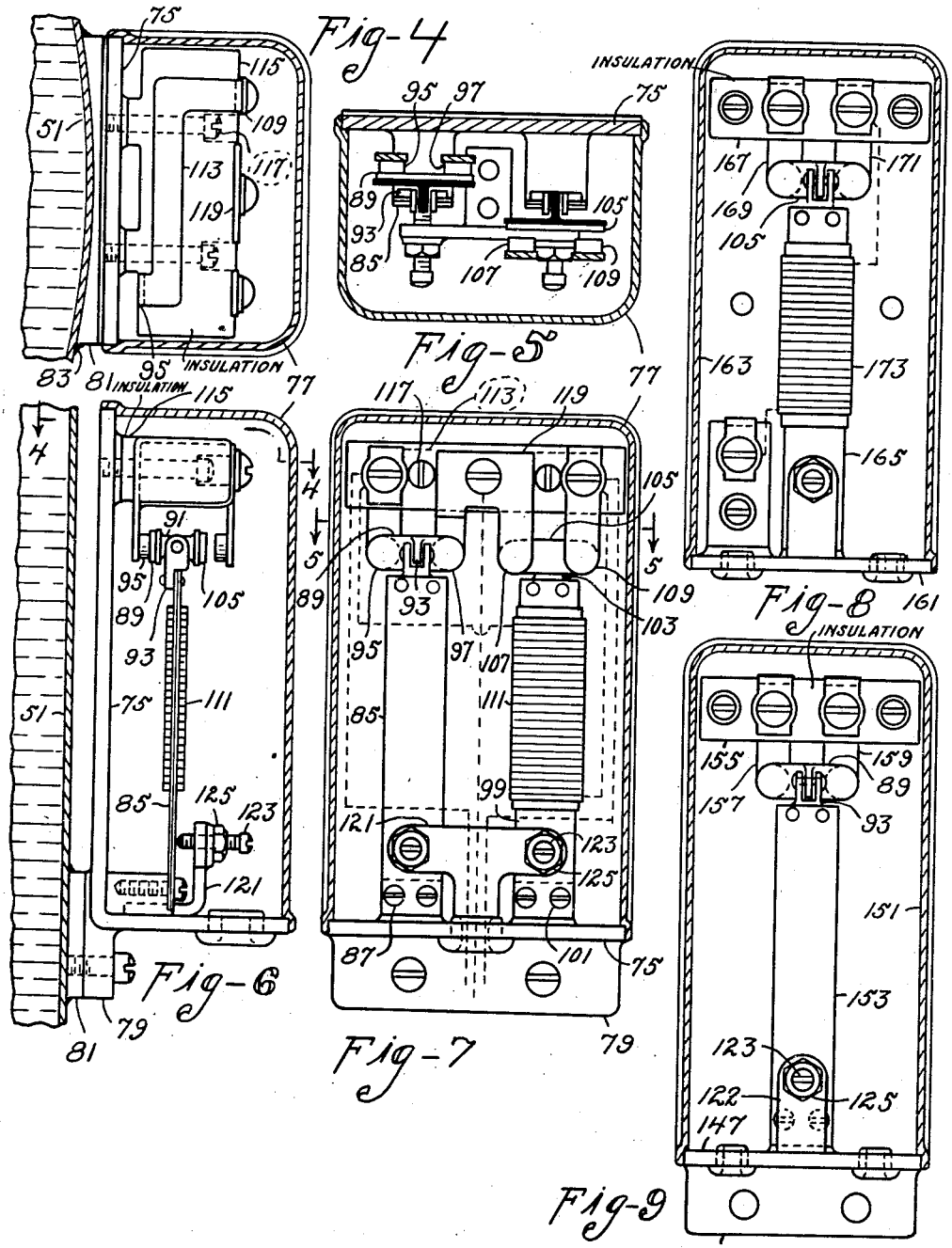

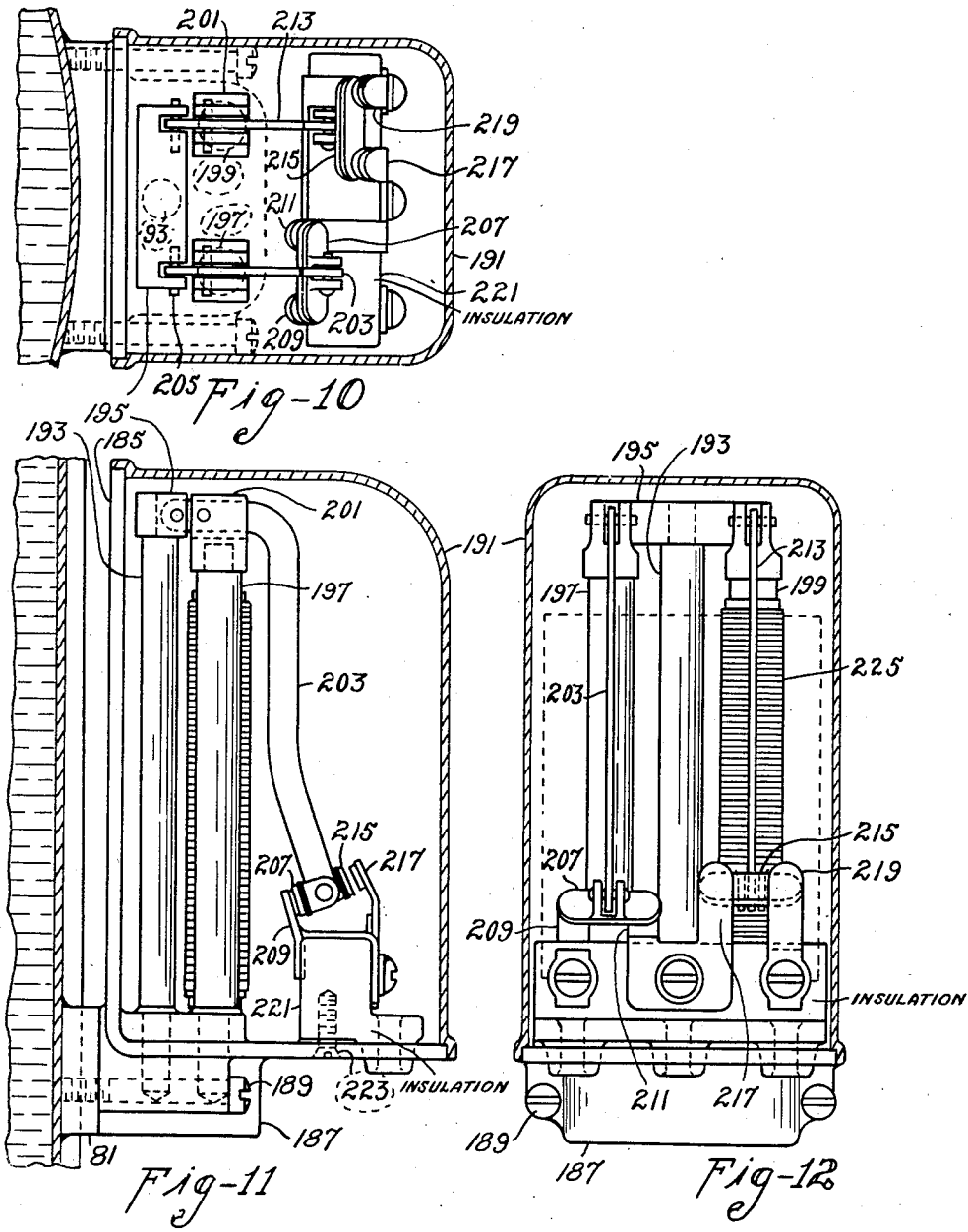

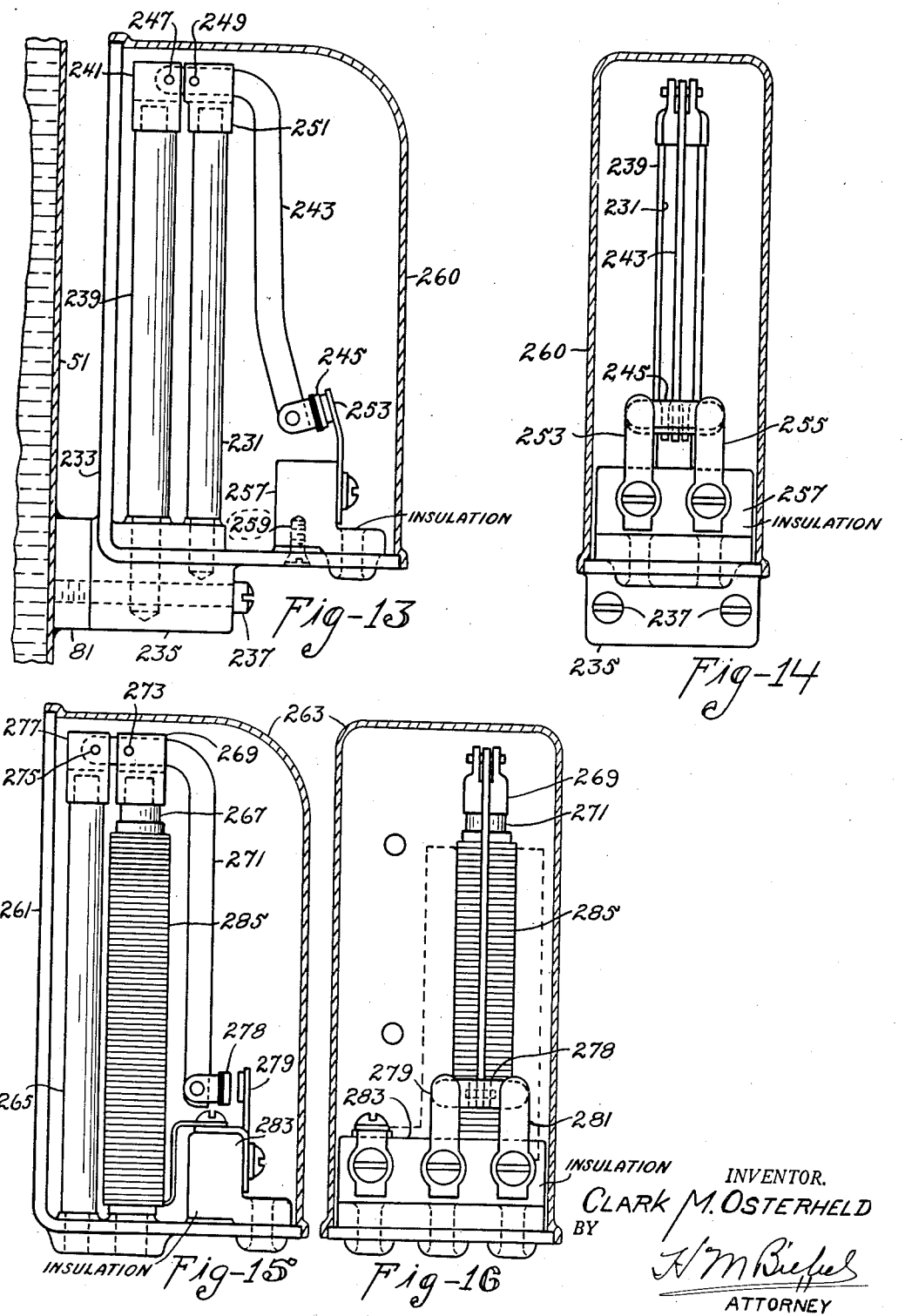

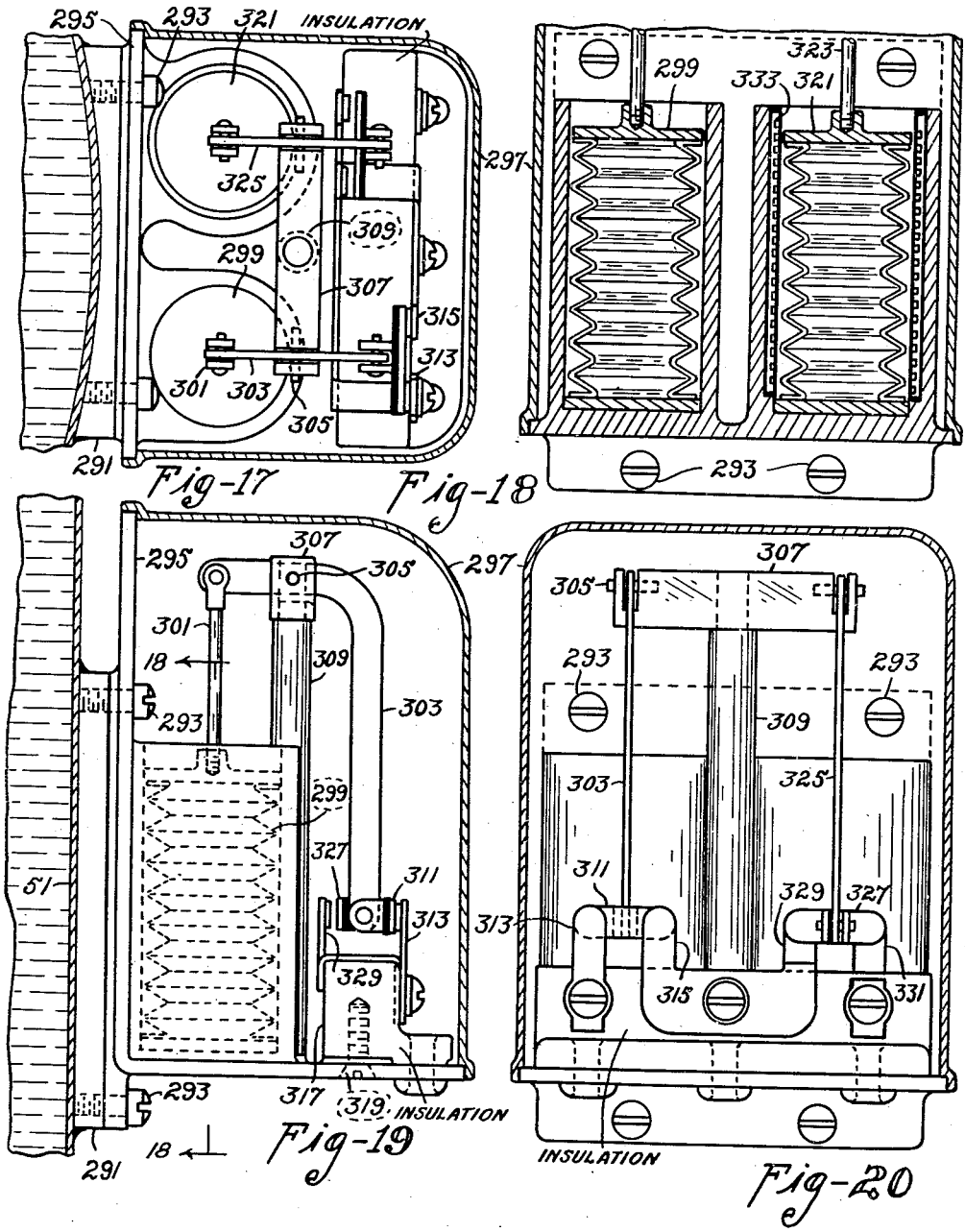

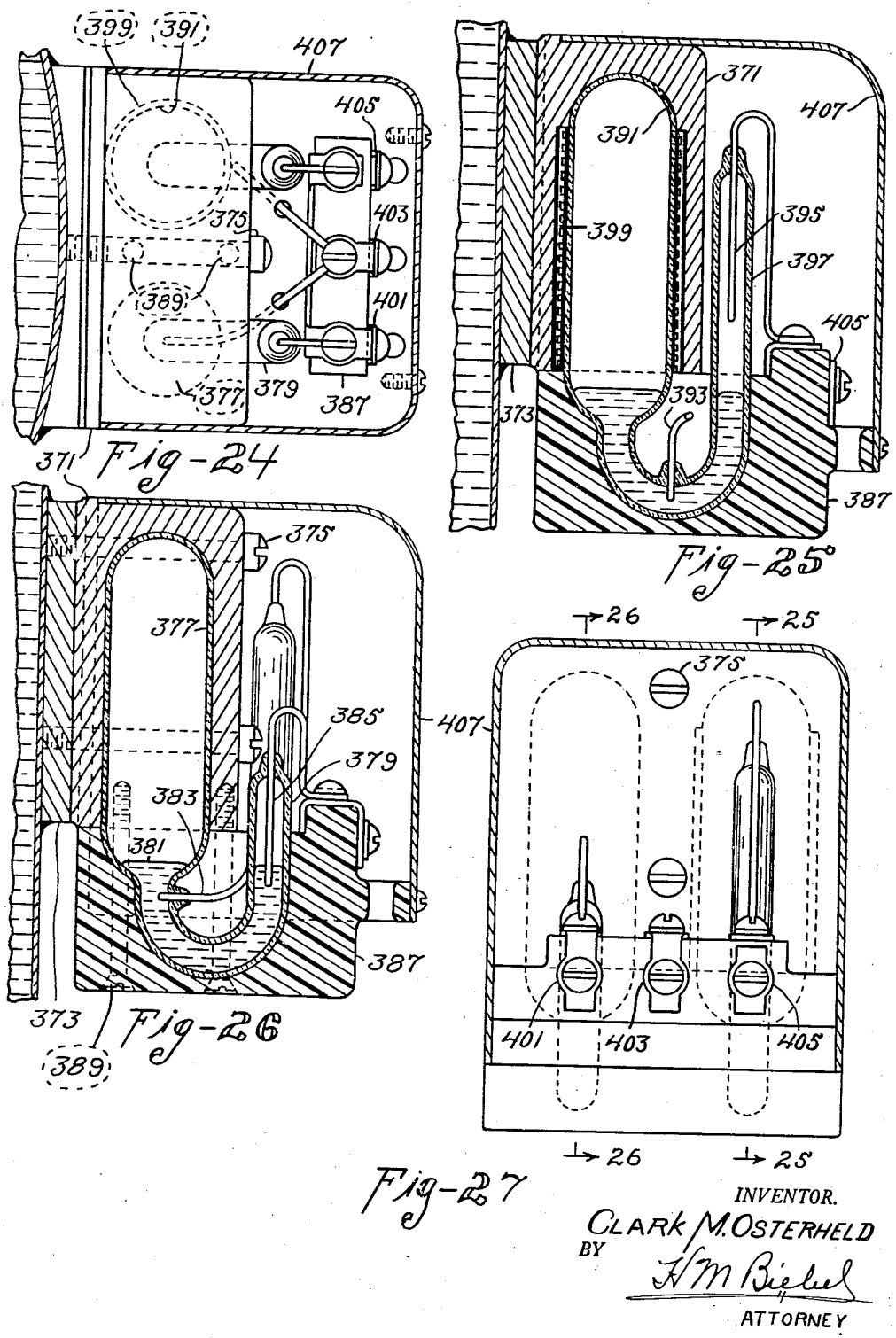

Feb. 18, 1947.  C. M. OSTERHELD  2,415,965
CREEP-TYPE THERMAL RETARDER FOR WATER HEATING CONTROL SYSTEMS
Filed May 29, 1944  8 Sheets-Sheet 8

INVENTOR.
CLARK M. OSTERHELD
BY
H. M. Bielfel
ATTORNEY

Patented Feb. 18, 1947

2,415,965

UNITED STATES PATENT OFFICE 2,415,965

CREEP-TYPE THERMAL RETARDER FOR WATER HEATING CONTROL SYSTEMS

Clark M. Osterheld, Stoughton, Wis., assignor to McGraw Electric Company, Elgin, Ill., a corporation of Delaware Application May 29, 1944, Serial No. 537,942

9 Claims. (Cl. 219—39)

My invention relates to electric heating and particularly to control devices for control systems of domestic hot water storage tank heaters.

An object of my invention is to provide a novel, inexpensive, and easily manufactured thermal retarder that shall cause immediate energization of an electric heater for a domestic hot water tank in case the tank contains a relatively large amount of cold water and to delay such energization for a predetermined time delay period in case the tank contains a relatively small amount of cold water.

Another object of my invention is to provide a thermal retarder which is so designed and constructed that it may be mounted on a hot water tank in its entirety, or only one part thereof may be mounted on a tank, while the other part may be mounted anywhere away from the tank.

Another object of my invention is to provide a thermal retarder comprising a pair of creep-type thermally-expansible means, each means controlling a separate switch.

Other objects of my invention will either be apparent from a description of several different forms of devices embodying my invention or will be pointed out in the course of such description and set forth particularly in the appended claims.

Figure 22:
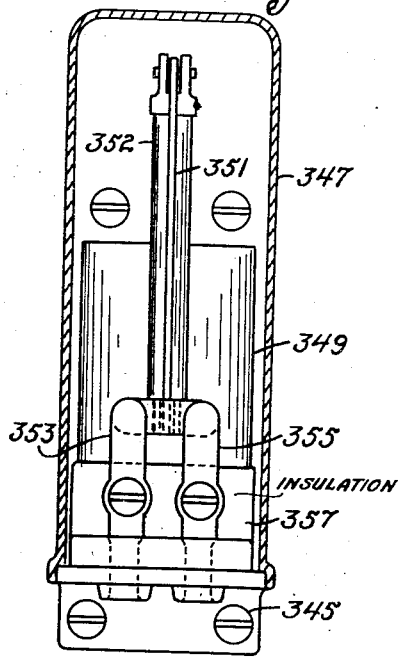
Figure 23:
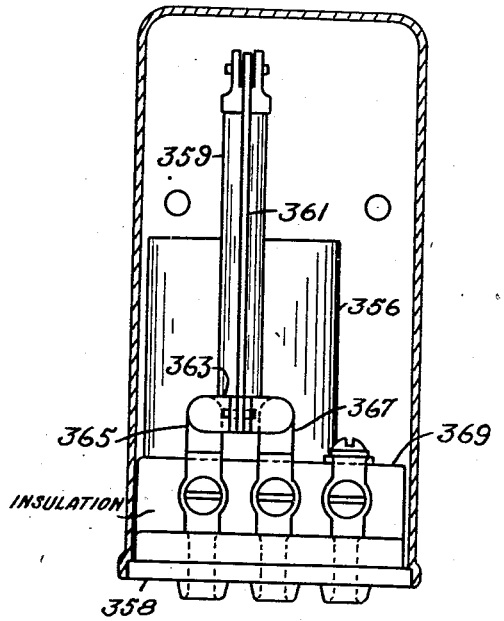
Figure 28:
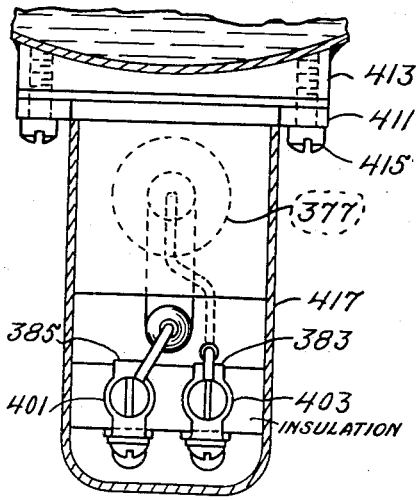
Figure 30:
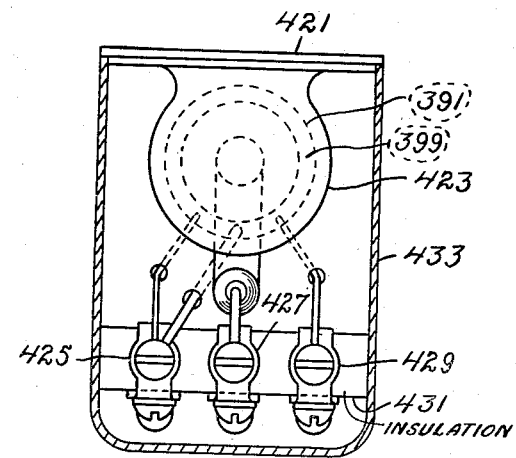
Figure 29:
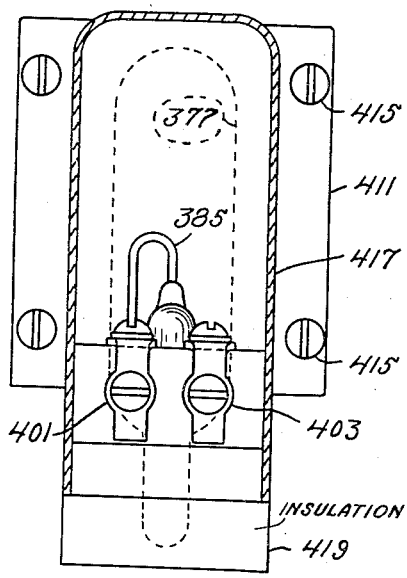
Figure 31:
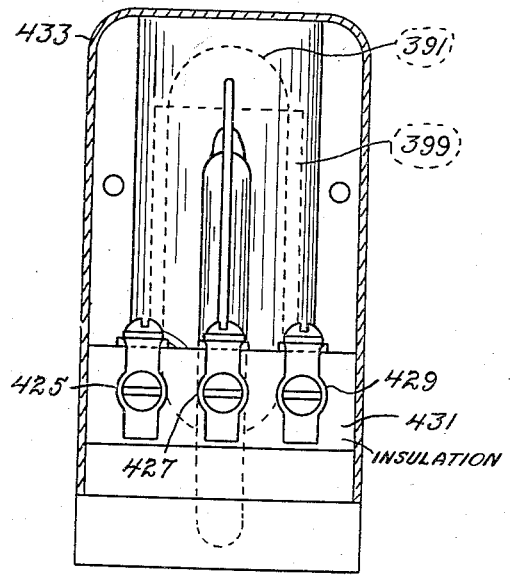

In the drawings,

Figure 1 is a vertical, sectional view through a domestic hot water tank, having associated therewith my improved control device, Fig. 2 is a diagram of connections, showing one form of control system embodying my invention, Fig. 3 is a diagram of connections of a modified control system embodying my invention, Fig. 4 is a horizontal, sectional view taken on the line 4—4 of Fig. 6 of one form of device embodying my invention, Fig. 5 is a horizontal, sectional view taken on the line 5—5 of Fig. 7 of the same form of device embodying my invention, Fig. 6 is a view in side elevation of the device shown in Figs. 4 and 5, with the cover shown in section, Fig. 7 is a view in front elevation of the device shown in Figs. 4, 5, and 6, with the cover shown in section, Fig. 8 is a view in front elevation of a modification of a device embodying my invention and showing the part thereof adapted to be mounted out of close heat-receiving relation with the tank, Fig. 9 is a view in front elevation of one part of the device embodying my invention, showing the part adapted to be mounted in close heat-receiving relation relatively to a tank, Fig. 10 is a top plan view of another form of device embodying my invention, showing a device in which both thermal switches are adapted to be mounted in heat-receiving relation on a tank, Fig. 11 is a view in side elevation of the device shown in Fig. 10, with the cover shown in section, Fig. 12 is a view in front elevation of the device shown in Figs. 10 and 11, with the cover shown in section, Fig. 13 is a view in side elevation of a modification of the device shown in Figs. 10, 11, and 12 and showing the part adapted to be mounted in heat-receiving relation on a hot water tank, with the cover shown in section, Fig. 14 is a view in front elevation of the device shown in Fig. 13, with the cover shown in section, Fig. 15 is a view in side elevation of a modification of the device shown in Figs. 10, 11, and 12 and illustrating the part adapted to be mounted out of close heat-receiving relation relatively to the tank, with the cover shown in section, Fig. 16 is a view in front elevation of the device shown in Fig. 15, with the cover shown in section, Fig. 17 is a top plan view of another modification of thermal retarder device embodying my invention and illustrating an assembly adapted to be mounted in heat-receiving relation on a tank, with the cover shown in section, Fig. 18 is a fragmentary, vertical, sectional view on the line 18—18 of Fig. 19, Fig. 19 is a view in side elevation of the device shown in Figs. 17 and 18, with the cover shown in section, Fig. 20 is a view in front elevation of the device shown in Figs. 17, 18, and 19, with the cover shown in section, Fig. 21 is a top plan view of one part of the device shown in Figs. 17 to 20 and illustrating that part thereof adapted to be mounted in heat-receiving relation on a tank, the cover being shown in section, Fig. 22 is a view in front elevation of the device shown in Fig. 21, the cover being shown in section, Fig. 23 is a view in front elevation of the second thermal switch part shown in Figs. 17 to 20 and illustrating that part adapted to be mounted out of close heat-receiving relation on a tank, the cover being shown in section, Fig. 24 is a top plan view of a still further modification of thermal retarder device embodying my invention, with the cover shown in section, Fig. 25 is a vertical, sectional view therethrough, taken on the line 25—25 of Fig. 27, Fig. 26 is a vertical, sectional view therethrough, taken on line 26—26 of Fig. 27, Fig. 27 is a view in front elevation of the device shown in Figs. 24, 25, and 26, the cover being shown in section, Fig. 28 is a top plan view of one part of the device shown in Figs. 24, 25, 26, and 27 and illustrating that part adapted to be mounted in heat-receiving relation on a tank, the cover being shown in section, Fig. 29 is a view in front elevation of the device shown in Fig. 28, the cover being shown in section, Fig. 30 is a top plan view of the second part of the device shown in Figs. 24, 25, 26, and 27 and illustrating that part thereof adapted to be mounted out of close heat-receiving relation relatively to a tank, with the cover shown in section, and, Fig. 31 is a view in front elevation of the device shown in Fig. 30, with the cover shown in section.

Broadly speaking, in practicing my invention, I provide a thermal retarder which will control the energization of an electric heater for a domestic hot water tank in accordance with the amount of cold water in the tank, causing immediate energization upon the entrance of a relatively large quantity of cold water into a tank, because of withdrawal of hot water therefrom, and causing energization of said heater with a predetermined time period of delay in case of the entrance of only a relatively small amount of cold water into the tank, because of the withdrawal of only a relatively small amount of hot water from the tank. While, as will hereinafter appear, I have shown a control system including a time-controlled switch for the heater, which switch is closed only during off-peak periods of a twenty-four hour day, my particular invention disclosed and claimed in the present application is not limited to the inclusion of a time-controlled switch. However, when such time-controlled switch is included, the immediate energization hereinbefore mentioned takes place upon closure of the time-controlled switch at the start of an off-peak period. However, if no time-controlled switch is provided, the immediate energization hereinbefore mentioned will take place at any time during a twenty-four hour day when the thermal retarder is subject to cold water.

Referring now particularly to Figure 1 of the drawings, I have there shown a tank 51 having a lower cold water inlet pipe 53, an upper hot water outlet pipe 55, a mass 57 of heat-insulating material therearound, which latter is held in place by an outer casing 59.

I provide preferably, but not necessarily, one electric heater 61, which, if only one heater is provided and used, is adapted to be located adjacent to the lower end portion of the tank and may be mounted in a tunnel 63. While I have shown a so-called clamp-on heater, I do not desire to be limited thereto, since any electric heater well known in the art may be used.

I provide a lower thermally-actuable heater control switch, designated generally by numeral 65, which comprises a bimetal bar 67 having one end thereof fixedly mounted in heat-receiving relation to the water in the tank at the lower end portion of the tank as on a block 69. The free end of bimetal bar 67 is adapted to engage with and be disengaged from a fixed contact member 71. The design, construction, and adjustment of the lower thermally-actuable switch 65 is such that the bimetal bar will be in engagement with contact member 71 when subject to cold water. In other words, the switch will be closed when subject to the temperature of cold water in the tank and will be disengaged from contact member 71 when subject to hot water. In other words, the switch will be open when subject to hot water in the tank. By cold water I mean water the temperature of which is on the order of 60° F. to 70° F., while by hot water I mean water the temperature of which is on the order of 150° F., the value varying both above and below said specific values. In domestic hot water tanks of the general kind shown in Fig. 1 of the drawings, which are connected to a source of supply of cold water and to piping connected with the usual home outlets, the withdrawal of hot water causes the hot water to flow from the top part of the tank and causes cold water to enter the lower part of the tank through inlet pipe 53, the dividing line between hot and cold water being fairly definite and the height of this dividing line being in accordance with the quantity of hot water withdrawn, that is, if only a relatively small quantity of hot water is withdrawn from the tank, the cold water may extend only to or slightly above the lower thermal switch 65, while the withdrawal of a relatively larger quantity of hot water will cause the upper level of the cold water to be positioned above the point where the thermal retarder, particularly disclosed and claimed in the present application, is positioned in heat-receiving relation on the tank.

A thermal retarder heater control switch unit 73 is secured in heat-receiving relation on the tank at substantially the middle of its height, although it may be located either above or below this point.

Referring now to Figs. 4 to 7 inclusive, I have there shown one form of thermal retarder unit comprising a base plate 75 of L-shape and of heat-conducting material having a cover 77 thereon adapted to be held by any suitable or desired means. A depending extension 79 is adapted to be secured against a supporting block 81, also of heat-conducting material, which has a front surface adapted to provide a heat flow path between it and extension 79 and which has an arcuate rear surface adapted to provide a heat flow path of low thermal reluctance between the outer surface of the tank 51 and member 81. I may mount member 81 against the outer surface of tank 51 as by a plurality of welding seams 83.

I provide a first bimetal bar 85 having its lower end secured in heat-conducting relation with the base 75 as by short machine screws 87. The upper end portion of bimetal bar 85 is provided with a contact bridging member 89 insulatedly supported on a support 91 pivotally secured to a bracket 93 secured to the upper end of bar 85. Contact bridging member 89 is adapted to engage with and be disengaged from a pair of contacts 95 and 97, to be hereinafter described in greater detail.

I provide a second bimetal bar 99 having its lower end secured to a part of the base by a plurality of short machine screws 101, the bar 99 being spaced from and extending substantially parallel to bar 85. The upper end of bar 99 has secured thereto a bracket 103, to which is pivotally and insulatedly secured a contact bridging member 105, which latter is adapted to engage with and be disengaged from a pair of contacts 107 and 109. The design, construction, and adjustment of the first bimetal bar 85 is such that contact bridging member 89 will be in engagement with contacts 95 and 97 when subject to cold water and will be disengaged therefrom when subject to hot water, that is at a temperature on the order of 150° F. Bimetal bar 99 is designed, constructed, and adjusted so that it will be out of engagement with contacts 107 and 109 when subject to a temperature of 0° F. and when subject to cold water in the tank and when subject to hot water in the tank, but will be in engagement therewith when subject to a higher temperature on the order of 200° F. to 250° F. This latter temperature is obtained by a heating coil 111 insulatedly mounted on bimetal bar 99, the energization of this heating coil being controlled jointly by the lower thermally-actuable switch 65 and a time-controlled switch, if such latter is provided.

The contact members 95 and 109 are electrically connected by a metallic connector 113, which is suitably secured to a block 115 of electric-insulating material, which latter is held in proper operative position at the upper end of member 75 by a pair of machine screws 117, the contact 109 is horizontally spaced from contact 95 from front to rear of the casing, while it is also spaced from contact 95 from left to right of the casing. Contact member 107 is connected to contact 97 as by a connector 119, the vertical plane of contact 107 being the same as that for contact 109, while the vertical plane of contact 97 is the same as that for contact 95. It will therefore be evident that the bimetal bars 85 and 99 will flex in the same direction upon increase of temperature thereof, that is they will flex in a clockwise direction, as seen in Fig. 6 of the drawings.

Adjusting means for the respective bimetal bars 85 and 99 are provided and are in the form of a bracket 121 having one portion thereof suitably secured to the bottom wall of base 75 and having screw-threaded machine bolts 123 extending through its widened vertical portion, which are adapted to be held in adjusted position by lock nuts 125. The adjusting screws 123 are positioned at the respective ends of the lateral extension of bracket 121, one screw being provided for each of the two bimetal bars 85 and 99. Adjustment of the screw 123 engaging bimetal bar 85 will permit of varying the temperature at which opening of the circuit will take place.

Referring now to Fig. 2 of the drawings, I have there shown a diagram of connections of the device shown in Figs. 4 to 7 inclusive in which both switches actuable by a creep-type bimetal bar are subject to the temperature of the water in the tank. While not necessary, I may make bimetal bar 85 of higher thermal sensitivity than bimetal bar 99, but since each of these bimetal bars actuates a separate switch, such difference in the sensitivity of the two bimetal bars is not required.

I provide a time-controlled switch 127, comprising a contact arm 129 and a second contact arm 131, which are adapted to be moved into engaged position to close a circuit controlled thereby during off-peak periods of a twenty-four hour day and are adapted to be moved out of engagement with each other during on-peak periods of a twenty-four hour day. The continuously-operative time-controlled switch 127 forms no part of my present invention, and any form now used by electric utility companies may be used. I provide a first supply circuit conductor 133 and a second supply circuit conductor 135, the first supply circuit conductor being connected to contact arm 129. The second contact arm 131 is connected by a conductor 137 with contact 107 and with contact 97. Contact 95 is connected by a conductor 139 with one terminal of heater 61, the other terminal of which is connected by a conductor 141 to contact 71 of the lower thermally-actuable switch 65. The other terminal 69 of the lower thermally-actuable switch 65 is connected by a conductor 143 to the second supply circuit conductor 135. One terminal of heating coil 111 on bimetal bar 99 is connected to contact 107 and to conductor 137, while the other terminal is connected by a conductor 145 to contact 71 of the lower thermally-actuable switch 65.

Let it now be assumed that the tank is filled full of cold water, either at the start of operation thereof or because all of the hot water in the tank has been withdrawn. As soon as the time-controlled switch 127 is closed at the start of an off-peak period, an energizing circuit through heater 61 will be closed, because of the fact that bimetal bar 85 is subject to cold water in the tank, with the result that contact bridging member 89 will be in engagement with contacts 95 and 97. This circuit is traceable as follows: from supply circuit conductor 133 through engaged contact arms 129 and 131, conductor 137, through engaged contacts 95 and 97 and contact bridging member 89, through conductor 139, heater 61, conductor 141, through closed switch 65, and through conductor 143 to the second supply circuit conductor 135. The energized heater 61 will cause rise of temperature of the water in the tank 51, the temperature of the water under these conditions being substantially the same from top to bottom thereof and increasing with length of time of energization of the heater 61. Depending upon the capacity of the tank and of the heater 61, the temperature of the water in the tank will reach a value on the order of 150° F. after a length of time on the order of say six hours; whereupon the lower thermally-actuable switch 65, as well as the first switch of thermal retarder unit 73, comprising particularly bimetal bar 85 and contact bridging member 89, will open, whereby energization of heater 61 is terminated. It is assumed, of course, that the time-controlled switch 127 will remain in closed position for a longer period than is required to heat all of the water in the tank, as energization of heater 61 is effected at the start of an off-peak period.

Energization of the heating coil 111 on bimetal bar 99 was also effected simultaneously with the heater 61, through a circuit traceable as follows: from supply circuit conductor 133 through contact arms 129 and 131, through a part of conductor 137 through heating coil 111, conductor 145, through closed switch 65 and through conductor 143 to the second supply circuit conductor 135. This will result in temperature rise of the second bimetal bar 99 to a value on the order of 200° F. to 250° F. in a length of time depending upon the adjustment of the switch and the use of a heating coil adapted to cause such predetermined rise of temperature in a predetermined length of time sufficient to cause closing movement of contact bridging member 105 with contacts 107 and 109. This closure of the second switch will provide a second circuit through heater 61, traceable as follows: from supply circuit conductor 133 through engaged contact arms 129 and 131, through a part of conductor 137, through engaged contacts 107 and 109 and contact bridging member 105, through conductors 113 and 139, heater 61, conductor 141, closed switch 65, and through conductor 143 to the second supply circuit conductor 135.

Let it be assumed that, starting at daybreak, the tank was full of hot water and that an amount of hot water was withdrawn from the tank during daylight hours sufficient to subject not only the thermally-actuable switch 65 to cold water, but also the thermal retarder switch 73. In this case, energization of the electric heater 61 would be effected immediately upon closure of the time-controlled switch at the start of an off-peak period, this energization continuing until substantially all of the water in the tank was hot, when the lower thermally-actuable switch 65 would interrupt the circuit.

If, on the other hand, only a relatively small amount of hot water was withdrawn from the tank during daylight hours, so that only the lower thermally-actuable switch 65 is subject to cold water, the energizing circuit through heating coil 111 would be closed immediately upon closure of the time-controlled switch, through the circuit already hereinbefore set forth. Closure of the second normally open switch, comprising the bimetal bar 99 and the contact bridging member 105 actuated thereby, would be delayed for a length of time on the order of four hours or more, when an energizing circuit through heater 61 would be effected by closure of the switch actuated by bimetal bar 99, as has already been hereinbefore set forth. This energization of heater 61 will continue until either all of the water in the tank is hot, when the heater will be deenergized by opening of the switch 65, or it will be deenergized by opening of the time-controlled switch 127.

Referring now particularly to Fig. 9 of the drawings, I have there shown a single unit thermal retarder switch, comprising a base 147, similar to member 75, having a depending extension 149 adapted to be secured against heat-conducting block 81 hereinbefore described. The member 147 has a cover 151, in which is located a bimetal bar 153, having its lower end supported in substantially the same manner as was hereinbefore set forth in connection with bimetal bar 85 shown in Figs. 4 to 7 inclusive. I have elected to use substantially the same numerals on similar or like parts, as were hereinbefore used in describing the parts shown in Figs. 4 to 7 inclusive. A block 155 of electric-insulating material extends laterally of the base 147 at the upper end thereof and has mounted thereon a pair of contact members 157 and 159 which are adapted to be engaged by contact bridging member 89. The design, construction, and adjustment of the thermal switch, shown in Fig. 9 of the drawings, is such that contact bridging member 89 will be in engagement with contacts 157 and 159 when support 147 is secured against supporting member 81 mounted on the tank 51 and when subject to cold water, but contact bridging member 89 will be moved out of engagement with contacts 157 and 159 when subject to hot water in the tank.

Referring now to Fig. 8 of the drawings, I have there illustrated a second thermally-actuable switch which is adapted to be positioned out of close heat-receiving relation relatively to the tank and which comprises a base 161 having a cover 163 secured thereto in any suitable or desired manner. A bimetal bar 165 has its lower end secured to a part of the base member and has a contact bridging member 105 pivotally secured thereto at its upper end in substantially the same manner as was hereinbefore set forth in regard to bimetal bar 99, shown in Figs. 4 to 7 inclusive. A block 167 of electric-insulating material is positioned on the base plate 161 adjacent the upper end thereof within the cover and has a pair of contact members 169 and 171 secured thereto. The design, construction, and adjustment of the thermal switch is such that it will be in open position until the temperature of bimetal bar 165 reaches a predetermined relatively high value, which may be on the order of 150° F. to 250° F. when the contact bridging member 105 will be moved into engagement with contacts 169 and 171. In order to obtain this relatively high temperature of bimetal bar 165, it has insulatedly mounted thereon a heating coil 173, which is of such wattage that it will require from four to six hours to raise the temperature of bimetal bar 165 to the aforesaid predetermined high temperature of 150° F. to 250° F. when contact bridging member 105 will be moved into engagement with contacts 169 and 171.

Referring now to Fig. 3 of the drawings, I have there shown a diagram of connections, including a first thermal switch, comprising the bimetal bar 153, which is adapted to be located in heat-receiving relation on the tank 51, and a second thermal switch, including a bimetal bar 165 and cooperating contact members adapted to be located out of close heat-receiving relation to the tank. The contact arm 131 of the time-controlled switch is connected by a conductor 175 with contact 157, while contact 159 is connected by a conductor 177 to one terminal of electric heater 61, the other terminal of which is connected by a conductor 141 to contact 71 of the lower thermally-actuable switch 65. Heating coil 173 on bimetal bar 165 has one of its terminals connected by a conductor 179 to contact 71, the other terminal of heating coil 173 being connected to contact 171. A conductor 181 connects contact 171 with contact arm 131. A conductor 183 connects contact 159 to contact 169.

It will be obvious that since the second bimetal bar 165 is not subject to the temperature of hot water in the tank, its maximum operating temperature, at which closure of the switch controlled thereby will be effected, need not be as high as was hereinbefore described in connection with bimetal bar 99.

If the tank is only partly filled with hot water, the amount of cold water being such that the thermal retarder 73 is subject to cold water, then energization of the heater 61 will be effected simultaneously with closure of the time-controlled switch 127 through a circuit traceable as follows: from supply circuit conductor 133, closed time switch 127, conductor 175, engaged contact members 157 and 159 and contact bridging member 89, conductor 177, heater 61, conductor 141, closed switch 65, and through conductor 143 to the second supply circuit conductor 135. This energization will continue until either all of the water in the tank is hot, when the lower thermally-actuable switch will cause opening of the energizing circuit, or until the time-controlled switch 127 is opened at the end of an off-peak period. If, on the other hand, the amount of cold water in the tank is sufficient only to subject the lower thermally-actuable switch 65 to cold water, then an energizing circuit through heating coil 173 will be closed, with the closure of the time-controlled switch 127, this circuit being as follows: from supply circuit conductor 133, through closed time switch 127, conductor 181, heating coil 173, conductor 179, closed switch 65, and through conductor 143 to the other supply circuit conductor 135. This will cause closure of the switch controlled by the bimetal bar 165 after a predetermined time delay period, which may be on the order of four to six hours. When this switch is closed, an energizing circuit will be established through heater 61, traceable as follows: from supply circuit conductor 133, closed switch 127, conductor 181, engaged contacts 171 and 169 and contact bridging member 105, conductors 183 and 177, heater 61, conductor 141, closed switch 65 and conductor 143 to the second supply circuit conductor 135. Energization of the heater 61 thus established, will continue until the heater is deenergized either by opening of the switch 65, in case all of the water in the tank is hot before the end of the off-peak period, or by opening of the time-controlled switch, whichever occurs first.

Referring now to Figs. 10, 11, and 12, I have there illustrated a modification of the device hereinbefore described, comprising creep-type bimetal bars as the thermally-expansible means. A heat-conducting base 185 has a depending integral extension 187 adapted to be secured against a block 81 of heat-conducting material as by a pair of short machine screws 189. A cover 191 is provided for the base 185. I provide a central non-expansible metal rod 193 having its lower end fitted into extension 187 and having a cross arm 195 fixedly secured thereto at its upper end. I provide a first thermally-expansible rod 197 and a second thermally-expansible rod 199, the lower end portions of which are adapted to be secured in the extension 187. Blocks 201 are secured to the upper ends of the rods 197 and 199. The two rods 197 and 199 are of different thermal expansivities, the rod 197 being say of aluminum, while rod 199 may be of an alloy, such as nickel steel of relatively small thermal coefficient of expansion.

I provide a switch arm 203, which is of substantially L-shape and is pivotally supported in block 201 mounted on rod 197, while the rear end of the horizontal arm is supported pivotally as by a pin 205 located at one end of cross arm 195. Arm 203 carries a contact bridging member 207 mounted insulatedly thereon and adapted to engage with and be disengaged from a pair of contacts 209 and 211. The design, construction, and adjustment of the first above described thermal switch is such that contact bridging member 207 will be in engagement with contacts 209 and 211 when expansion rod 197 is subject to cold water in the tank and will be out of engagement therewith when subject to hot water in the tank. I provide a second switch arm 213 substantially similar to arm 203, which has on its lower end a contact bridging member 215 adapted to engage with and be disengaged from contacts 217 and 219. The contacts 209, 211, 217, and 219 are supported at the back and the front of a block 221 of electric-insulating material suitably secured against the base of member 185 as by one or more short machine screws 223. The design, construction, and adjustment of the switch controlled by the second expansion rod 199 is such that contact bridging member 215 will be out of engagement with contacts 217 and 219 when subject to cold water in the tank and when subject to hot water in the tank, but will be in engagement therewith when the temperature of rod 199 is at an appreciably higher value on the order of 200° to 250° F. In order to raise the temperature of rod 199 to this value, I provide a heating coil 225, which is insulatedly mounted on and supported by rod 199.

The operation of the modification shown in Figs. 10, 11, and 12 is substantially the same as that shown in Figs. 4, 5, 6, and 7 hereinbefore described, heating coil 225 being the same as heating coil 111, shown in Fig. 2 and in Fig. 7 of the drawings. The operation being substantially the same, no further description thereof will be given.

Referring now to Figs. 13 and 14, I have there shown a first thermal switch, comprising a non-expansible metal rod 231 having its lower end supported by a portion of a base member 233 which has a depending extension 235 to permit of securing it as by machine screws 237 against a block 81 which is secured against the outer surface of tank 51.

I provide an expansion rod 239, having its lower end fitted into the extension 235 and having a block 241 secured to its upper end. A switch arm 243 of substantially L-shape, has a contact bridging member 245 insulatedly mounted thereon at its lower end, while its upper end is pivotally supported by a pair of pivot pins 247 and 249 mounted in block 241 and in a block 251 secured to the upper end of non-expansible rod 231. A pair of contacts 253 and 255 are supported by a block 257 of electric-insulating material secured to the bottom portion of member 233 by screws 259. The design, construction, and adjustment of the thermal switch shown in Figs. 13 and 14 are such that the contact bridging member 245 will be in engagement with contacts 253 and 255 when subject to cold water in the tank and will be disengaged therefrom when subject to hot water in the tank, all as has hereinbefore been described in connection with other forms of thermal switches. A cover 260 is provided for the base 233.

Referring now to Figs. 15 and 16, I have there illustrated a second thermal switch, comprising a casing consisting of a base 261 having a cover 263 thereon and having a non-expansible rod 265 with its lower end secured in the lower portion of base 261. A second thermally-expansible rod 267 has its lower end secured in the lower portion of base 261 and has a block 269 secured thereto at its upper end. A switch arm 271 of substantially L-shape is pivotally supported on a pin 273 fitted into block 269, a second pivot pin 275 being provided in a block 277 secured to the upper end of the non-expansible rod 265. A contact bridging member 278 is insulatedly mounted on the lower end of arm 271 and is adapted to engage with and be disengaged from two contacts 279 and 281 which are insulatedly mounted on a block 283 of electric-insulating material secured in any suitable or desired manner to the lower portion of member 261. A heating coil 285 is insulatedly mounted on rod 267 and is adapted to be energized in the same manner as was hereinbefore described. The design, construction, and operation of the thermal switch disclosed in Figs. 15 and 16 are such that the switch will be in open position at lower temperatures up to say 100° F. but will be moved into closed position by expansion of rod 267 when heated to a predetermined relatively high temperature on the order of 150° F. or over. In the case of the combination thermal retarder switch unit, shown in Figs. 10 to 12 inclusive, the predetermined higher temperature at which closure of the second switch will be effected, must be much higher, because of the fact that this switch is also subject to the temperature of hot water in the tank; whereas this predetermined higher temperature need not be as high, since the rod 267 is out of close thermal relation relatively to the tank.

Referring now to Figs. 17 to 20 inclusive, I have there shown another modification of a thermal retarder heater control switch unit in which the thermal-sensitive means includes expansion bellows. A block 291 of heat-conducting material is suitably secured against the outside surface of tank 51 and has secured thereagainst, as by short machine screws 293, a base plate 295 adapted to support the parts of my thermal retarder heater control switch unit. A cover 297 is provided for the base member 295.

I provide a first thermally-expansible bellows 299 having its lower end secured in good heat-conducting relation with member 295, while its upper end has secured thereto a rod 301 having a pivotal connection with a horizontally-extending part of a switch arm 303, which is of substantially L-shape. The arm 303 is pivotally supported as on a pivot pin 305 mounted in one end of a horizontal bar 307, which is supported on a non-expansible rod 309, which rod may be of Invar. The switch arm 303 is provided at its lower end with a contact bridging member 311, which is adapted to be engaged with and be disengaged from contacts 313 and 315, which are mounted on a block 317 of electric-insulating material, which is suitably secured to the bottom portion of member 295 as by machine screws 319. The design, construction, and adjustment of the first switch, above described, is such that the contact bridging member 311 will be in engagement with contacts 313 and 315 when subject to cold water in the tank and will be out of engagement therewith when subject to hot water in the tank.

I provide a second expansion chamber 321, having its lower end portion in heat-receiving relation with the bottom of member 295 and having a rod 323 secured to its upper end, which is pivotally engaged with the end of the horizontal arm of a switch arm 325. The lower end of arm 325 has insulatedly mounted thereon a contact bridging member 327, which is adapted to engage with and be disengaged from contacts 329 and 331, which are also mounted on electric-insulating block 317. Contact 329 is electrically connected with contact 315. The design, construction, and adjustment of the second thermally-actuable switch is such that the contact bridging member 327 will be out of engagement with contacts 329 and 331 when subject to cold water in the tank and when subject to hot water in the tank, but will be in engagement therewith when subject to a higher temperature, which temperature may be on the order of 200° F. to 250° F. In order to obtain this relatively high temperature, I provide a heating coil 333, which is positioned around the expansion chamber 321, this heating coil being substantially the same as heating coils 111 and 225, already hereinbefore described. The thermal retarder switch unit, shown in Figs. 17 to 20 inclusive, is adapted to be mounted in heat-receiving relation on a tank in substantially the same position as was hereinbefore stated for thermal retarder switch unit 73, shown in Fig. 1 of the drawings. Substantially the same comments apply to the operating characteristics of the thermal retarder switch unit, shown in Figs. 17 to 20 inclusive, as have already been hereinbefore made.

Referring now to Figs. 21 and 22, I have there illustrated a first thermal switch embodying an expansion chamber as the thermally-expansible means, as it will be designed when only the first switch will be in heat-receiving relation with the tank, while the second switch will be out of close heat-receiving relation relatively thereto. I provide a heat-conducting base plate 341, which is adapted to be held against a heat-conducting support 343 as by short machine screws 345. A cover 347 is provided for member 341. An expansion chamber 349, substantially the same as expansion chamber 299, is located in heat-receiving relation relatively to member 341 and is adapted to operatively engage a switch arm 351 similar to arm 303 pivotally supported on a non-expansion rod 352. A contact bridging member 311 is insulatedly mounted on arm 351 and is adapted to engage with and be disengaged from a pair of contacts 353 and 355, which are mounted on a block 357 of electric-insulating material positioned adjacent the lower end portion of member 341. The other details of the connection of switch arm 351 to the expansion chamber 349 are substantially like those shown in Figs. 17 to 20 inclusive. This first thermally-expansible switch is to be mounted in heat-receiving relation on a tank and is so designed, constructed, and adjusted that it will be in closed position when subject to cold water in the tank and will be in open position when subject to hot water in the tank.

Referring now to Fig. 23 of the drawings, I have there illustrated a second thermal switch embodying an expansion chamber 356, similar to chamber 321, shown in Figs. 17 to 20 inclusive, mounted on a base member 358. A non-expansible rod 359 is adapted to pivotally support a switch arm 361, having a contact bridging member 363 insulatedly mounted on its lower end which is adapted to engage with and be disengaged from contacts 365 and 367 which are supported on a block 369 of electric-insulating material. The other details of the connection of switch arm 361 with the expansion chamber 356 are substantially the same as shown in Figs. 17 to 20 inclusive. The general design and construction of this second switch is substantially the same as that of the switch arm 325 shown in Figs. 17 to 20 inclusive, that is a heating coil is provided for the expansion chamber 356, the energization of which heating coil is controlled in substantially the same manner as has already been hereinbefore set forth in connection particularly with Fig. 3 of the drawings. This second thermal switch is adapted to be supported away from the tank and out of close heat-receiving relation relatively thereto, as has already been hereinbefore described for similar switches shown in other figures of the drawings.

Referring now to Figs. 24 to 27 inclusive, I have there shown a still further modification of thermally-expansible means comprising a closed chamber, of U-shape and of electric-insulating material, such as glass, partly filled with an electric-conducting substance, such as mercury. A supporting block 371 of heat-conducting metal has openings therein and is adapted to be held against a block 373, secured to a tank 51, by machine screws 375. In the first of the openings in block 371, I locate the enlarged part of a glass tube 377, having, in addition to the enlarged portion, a return bent portion 379. The intermediate portion is filled with mercury 381, and a first contact 383 is provided just above the return bent portion, while a second contact 385 extends into the end portion of part 379. The space above the mercury 381 in part 377 is filled with a thermally-expansible and vaporizable material known in the art, so that when this thermally-expansible switch means is subject to cold water in the tank, the level of the mercury will be substantially that shown in Fig. 26 of the drawings, while when it is subject to the temperature of hot water in the tank, the level of the mercury in the reduced part below part 377 will be below that of the contact 383 to thereby interrupt the circuit. I provide a block 387 of electric-insulating material to support the member comprising parts 377 and 379 and secure the block in proper operative position against block 371 as by machine screws 389.

A second thermally-expansible means and switch are shown in Fig. 25 as comprising a member of U-shape 391, which is filled with a thermally-expansible and vaporizable material in an enlarged upper end portion thereof, and which is located in the second opening in member 371. A contact 393 is positioned in substantially the lowermost portion of the intermediate part, and a second contact 395 is positioned at the upper end of the reduced return bent portion 397. A heating coil 399, shown schematically only, is provided in the second opening around the enlarged portion of member 391, its function being substantially the same as that of the other hereinbefore described heating elements for the second thermally-expansible means. I provide contact terminals 401, 403, and 405, which are mounted on block 387 of electric-insulating material hereinbefore described. A cover 407 is provided. The circuit between contacts 393 and 395 is open when the thermal retarder unit is subject to cold and to hot water in the tank and is closed when heating coil 399 has been energized for a length of time on the order of say four to five hours, so that the temperature of member 391 is on the order of 200° to 250° F.

Referring now to Figs. 28 and 29, I have there shown a first thermally-expansible means, similar to the first thermally-expansible means shown in Figs. 24 to 27 inclusive, adapted to be mounted in heat-receiving relation on a tank. It includes a base 411 adapted to be secured against a heat-conducting block 413 as by short machine screws 415. A cover 417 is provided. Member 411 includes a relatively heavy block having an opening therein adapted to receive the enlarged end portion 377, shown in Fig. 26, a block 419 of electric-insulating material being secured against the bottom of the aforesaid block to hold the member of U-shape in proper operative position therein. Substantially the same remarks apply to the device shown in Figs. 28 and 29 as were hereinbefore made in connection with the first thermal switch shown in Figs. 24 to 27 inclusive.

Referring now to Figs. 30 and 31, I have there shown a base 421 having a block 423 integral therewith and having an opening therein adapted to receive member 391, as well as a heating coil 399 therearound, all as has hereinbefore been described for the similar part shown in Figs. 25 and 27. The terminals are adapted to be connected with contact terminals 425, 427, and 429, which are mounted on a block 431 of electric-insulating material. A cover 433 is provided. The device shown in Figs. 30 and 31 is adapted to be mounted out of close heat-receiving relation to the tank 51, as has already been hereinbefore described for similar devices shown in certain of the drawings.

Applicant wishes to point out that while he has not described in detail the construction of the thermally-expansible means, including a mercury column, an expansion chamber, and an expansion rod, it is obvious that the construction and operation of these devices is substantially the same as that which has been set forth in connection with the parts shown in Figs. 4 to 9 inclusive. Broadly, the thermally-expansible means disclosed and claimed in the present application are of the creep-type, that is the movement of a part of the thermally-expansible means is substantially uniform with change of temperature, and while no specific means have been described by which the switch arms may be held in closed or in open position during relatively large temperature changes, it is to be understood that I may use any means now well known in the art for accomplishing such objects.

The different devices embodying my invention all use creep-type thermostatic means, and while both switches of any set may be mounted in heat-receiving relation on a tank, this is not necessary, and the second switch, namely the one having a heating coil operatively associated therewith, may be mounted anywhere and electrically connected with the first switch and the rest of the circuit by electric conductors, as is shown more particularly in Fig. 3 of the drawings.

Various modifications may be made in the devices embodying my invention without departing from the spirit and scope thereof, and all such modifications coming clearly within the scope of the appended claims are to be considered as covered thereby.

I claim as my invention:

1. A thermal retarder switch unit for hot water storage tank heaters, comprising a first switch, a first creep-type thermally-expansible means subject to heat interchange with water in the tank and adapted to hold said first switch in closed position when subject to cold water in the tank and to hold it in open position when subject to hot water in the tank, a second switch connected in shunt with said first switch, a second creep-type thermally-expansible means adapted to hold said second switch in open position through a range of from 0° F. to a value on the order of 200° F. to 250° F. and to hold it in closed position at temperatures above 200° F. to 250° F. and a heating coil for said second thermally-expansible means for raising the temperature of said second thermally-expansible means irrespective of the position of said switches.

2. A thermal retarder switch unit for hot water storage tank heaters, comprising a first switch, a first creep-type thermally-expansible means in close heat-receiving relation with the water in the tank for actuating said switch, a second switch connected in shunt with said first switch, a second creep-type thermally-expansible means for actuating said second switch and means for changing the temperature of the second thermally-expansible means independent of the tank water temperature and of the position of said switches.

3. A thermal retarder switch unit for hot water storage tank heaters, comprising a pair of switches connected in shunt circuit with each other, a first creep-type thermally-expansible means for actuating the first of said switches, a second creep-type thermally-expansible means for actuating the second of said switches, at least one of said thermally-expansible means being in close heat-receiving relation with the water in the tank and means for changing the temperature of the second thermally-expansible means independent of the tank water temperature and of the position of said switches.

4. A thermal retarder switch unit for hot water storage tank heaters, comprising a pair of switches, a first creep-type thermally-expansible means for actuating the first of said switches controlled by tank water temperature and selectively movable into closed and into open position in accordance with subjection to cold and to hot water in the tank, a second creep-type thermally-expansible means for actuating the other switch located out of close heat-receiving relation with the water in the tank and a heating coil for the second means effective to raise the temperature thereof and cause closing movement of the second switch irrespective of the position of said switches.

5. A thermal retarder switch unit for hot water storage tank heaters, comprising a first switch, a first creep-type thermally-expansible means to hold said first switch selectively in closed and then in open position when subject to the end temperatures of a first predetermined temperature range of from 70° F. to 150° F., a second switch and a second creep-type thermally-expansible means located out of close heat-receiving relationship with the water in the tank to hold said second switch selectively in open and then in closed position when subject to the end temperatures of a second predetermined temperature range of from 0° F. to a value above 250° F., said first and second temperature range overlapping at least partially and a heating coil for changing the temperature of the second thermally-expansible means independent of the tank water temperature and of the position of said switches within said last mentioned range.

6. A thermal retarder switch unit for hot water storage tank heaters, comprising a first switch, a first creep-type heat-expansible means subject to heat interchange with the water in the tank for actuating said first switch and adapted to move it into and hold it in closed position when subject to cold water in the tank and to move it into and hold it in open position when subject to hot water in the tank, a second switch connected in shunt circuit with said first switch, a second creep-type heat-expansible means for actuating said second switch and out of heat-interchange with the water in the tank adapted to move it into and hold it in open position when subject to temperatures below 200° F. to 250° F. and to move it into and hold it in closed position when subject to temperatures over 200° F. and a heating coil for said second means to raise its temperature to a value on the order of 200° F.

7. A thermal retarder switch unit for hot water storage tank heaters, comprising a first and a second switch connected in shunt circuit with each other, a first creep-type thermally-expansible means adapted to be subject to heat-exchange with water in the tank and to hold said first switch in closed position when subject to cold water in the tank and to hold it in open position when subject to hot water in the tank, a second creep-type thermally-expansible means for holding said second switch in open position when subject to cold and to hot water in the tank and for holding it in closed position when subject to a predetermined high temperature greater than that of hot water and a heating coil for said second means for heating the same to said predetermined high temperature irrespective of the position of said switches.

8. A thermal retarder switch unit for hot water storage tank heaters, comprising two separate switches connected in shunt to each other, a first creep-type thermally-expansible means adapted to be in close thermal communication with the water in the tank and to hold one of said switches in closed position when subject to cold water in the tank and to hold it in open position when subject to hot water in the tank, a second creep-type thermally-expansible means adapted to be located out of close thermal communication with the water in the tank and to hold the other switch in open position at all temperatures below a predetermined value on the order of that of hot water and to hold the other switch in closed position at all temperatures above said predetermined value and independent electrical means for raising the temperature of said second thermally-expansible means to said predetermined value irrespective of the position of said switches.

9. A thermal retarder switch unit for a hot water storage tank heater circuit, said tank being subject to withdrawal of varying quantities of hot water during a twenty-four hour day, said unit comprising two separate switches connected in shunt with each other, two separate creep-type thermally-expansible means for actuating said two switches, the first thermally-expansible means being in close thermal-communication with the water in the tank and the second thermally-expansible means being out of close thermal communication with the water in the tank and having an electric heating coil to raise its temperature, said two thermally-expansible means being selectively effective to cause closure of said circuit and energization of said heater immediately and with a predetermined time delay period in dependence upon the amount of cold water in the tank.

CLARK M. OSTERHELD.

REFERENCES CITED

The following references are of record in the file of this patent:

UNITED STATES PATENTS

| Number | Name | Date |
|---|---|---|
| 1,362,356 | Schneider | Dec. 14, 1920 |
| 1,442,048 | Christian | Jan. 16, 1923 |
| 1,074,215 | Schuirmann | Sept. 30, 1913 |
| 1,795,741 | Shoemberg et al. | Mar. 10, 1931 |
| 2,248,531 | Harris | July 8, 1941 |
| 2,046,718 | Bletz | July 7, 1936 |